No. 608,406. Patented Aug. 2, 1898.
S. B. KITCHIN.
AUTOMATIC FLEXIBLE COUPLING FOR TRAIN PIPES.
(Application filed Sept. 18, 1897.)
(No Model.) 2 Sheets—Sheet 1.
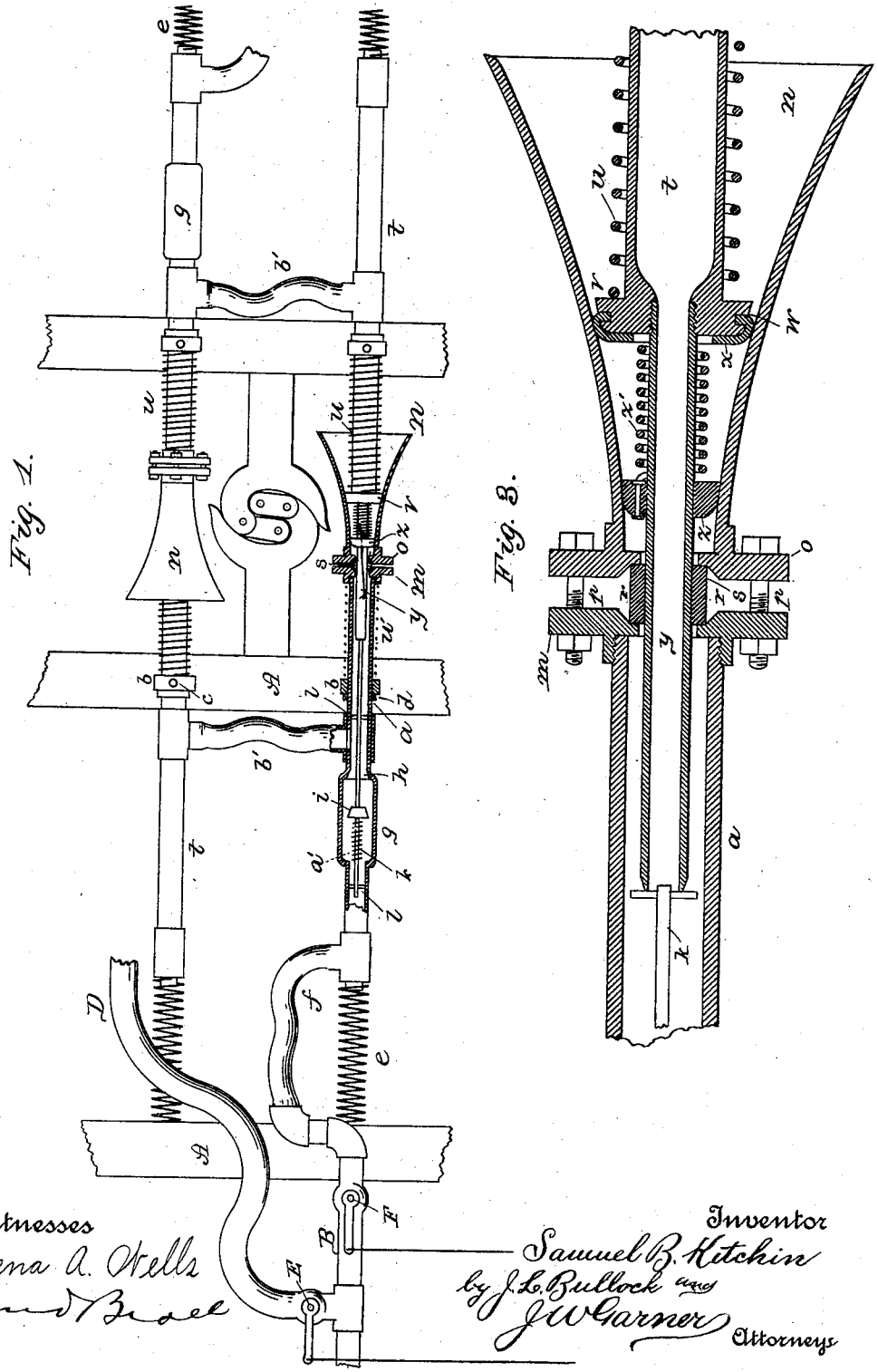
Witnesses
Vena A. Wells
Inventor
Samuel B. Kitchin
by J. L. Bullock and
J. W. Garner
Attorneys No. 608,406. Patented Aug. 2, 1898.
S. B. KITCHIN.
AUTOMATIC FLEXIBLE COUPLING FOR TRAIN PIPES.
(Application filed Sept. 18, 1897.)
(No Model.) 2 Sheets—Sheet 2.
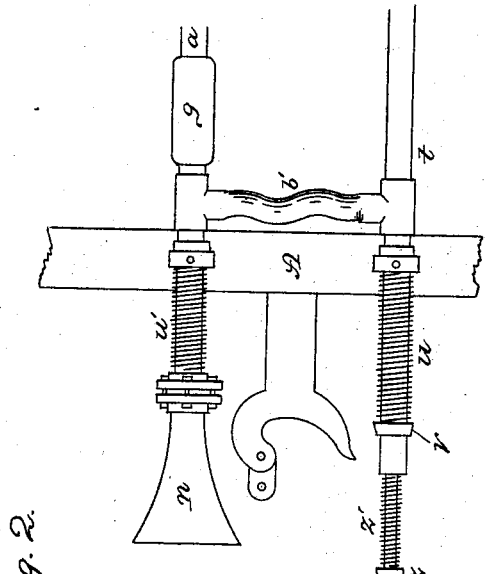
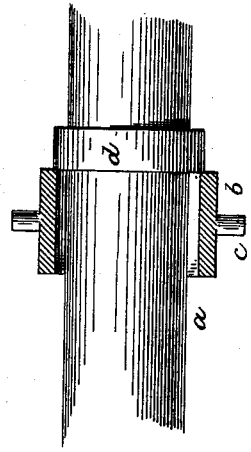
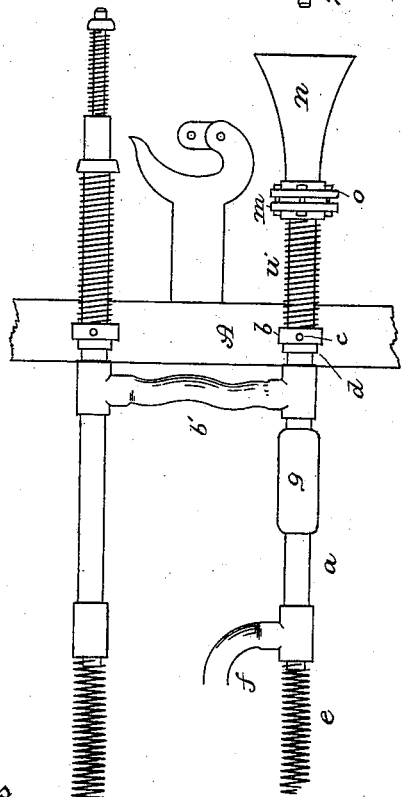
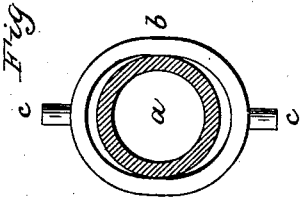
Witnesses
Vena A. Wells.
Beall
Inventor
Samuel B. Kitchin
by J. L. Bullock and
J. W. Garner
Attorneys

United States Patent Office.

SAMUEL B. KITCHIN, OF SCOTLAND NECK, NORTH CAROLINA.

AUTOMATIC FLEXIBLE COUPLING FOR TRAIN-PIPES.

SPECIFICATION forming part of Letters Patent No. 608,406, dated August 2, 1898.

Application filed September 18, 1897. Serial No. 652,087. (No model.)

*To all whom it may concern:*

Be it known that I, SAMUEL B. KITCHIN, a citizen of the United States, residing at Scotland Neck, in the county of Halifax and State of North Carolina, have invented a new and useful Improvement in Automatic Flexible Couplings for Train-Pipes, such as are employed in air-brake, heating, and lighting systems, of which the following is a specification.

My invention relates to an improvement in automatic flexible couplings for train-pipes, such as are employed in air-brake, heating, and lighting systems; and it consists in the peculiar construction and combination of devices that will be more fully set forth hereinafter and particularly pointed out in the claims.

The object of my invention is to provide a train-pipe coupling which is adapted to be used in connection with air-brake, lighting, or heating systems on railroad-trains, which will automatically couple and uncouple when the cars are run together or pulled apart and simultaneously open or close the valves which establish or cut off communication between the pipes of the various cars, which shall be simple and cheap in construction, efficient in operation, and is capable of yielding to the motion of the train and the play between the cars, so as to avoid injury thereby.

In the accompanying drawings, which illustrate my invention, Figure 1 is partly an inverted plan view and partly a horizontal section of a train-pipe-coupling system embodying my improvements, showing the cars coupled. Fig. 2 is a similar view of the same, showing the cars uncoupled. Figs. 3, 4, and 5 are detail views.

$a$ represents a pipe, which is secured under one of the cross-beams A of the bottom of a car by means of a swivel-collar $b$, through which the pipe passes, and which swivel-collar is free to turn on its pivots $c$, Figs. 4 and 5, and thereby permit the pipe to play freely and accommodate itself to the motion of the train and also render the pipe capable of longitudinal movement. A stop-flange $d$ is provided on the pipe, which stop-flange when the pipe is at the outer limit of its longitudinal motion comes in contact with the swivel-collar. A coiled extensile spring $e$ has one end attached to the inner end of the pipe $a$, and the other end of said spring is attached in any suitable manner to a suitable support under the car. The function of this spring is to normally retain the pipe $a$ in a horizontal position lengthwise under the car, and yet allow the pipe to move lengthwise and to play either horizontally or vertically at its ends. A flexible pipe $f$ is connected to the pipe $a$, near the inner end thereof, by a T-coupling, and the other end of said flexible pipe is connected to the air, gas, or steam pipe B of the air-brake, lighting, or heating system. The pipe $a$ has the enlarged cylindrical portion $g$ near its inner end, and at the outer end of said cylinder is a valve-seat $h$.

A valve $i$ is arranged in the cylinder and is supported on the valve-rod $k$, which extends throughout nearly the entire length of the pipe $a$ and is supported in guides or crosses $l$, which permit the valve and its rod to play freely in a longitudinal direction and yet to not obstruct the free passage of air, gas, steam, or fluid through the pipe. A flange head or collar $m$ is screwed to the outer end of the pipe.

$n$ represents the bell-shaped member of the automatic coupling which forms the outer extension of the pipe $a$ and has at its inner end a flange head or collar $o$, which is secured to the flange head or collar $m$ by bolts $p$. The said flange-heads, which, together with the bolts, serve to couple the bell-shaped member to the pipe $a$, are provided with central openings to admit the free passage of air, gas, steam, or fluid through the pipe and with concentric annular recesses $r$, in which is seated a packing-ring $s$.

When my train-pipe couplings are used in connection with air-brake systems, for which they are primarily designed, the packing-ring $s$ will be made of rubber. The width of the packing-ring is such that when the coupling is effected between the pipe and the bell-shaped member there will be a space between the flange-heads $m$ $o$, and as the packing-collar wears the bolts are tightened to preserve its efficiency.

A coupling-pipe $t$ is secured under another car in the same manner as the pipe $a$ and is likewise provided with a swivel-collar to permit it to play and a spring at its inner end to maintain it normally in a horizontal position, as shown. A coiled extensile spring $u$ is also arranged on the pipe $t$ and bears between the swivel-collar and the head $v$ on the outer end of said pipe, which head is circular in form and of such size as to adapt it to enter the bell-shaped coupling member opposite. An annular groove $w$ is made in the edge of the head $v$, which serves to receive the edge of a packing-ring $x$, which may be made of rubber or other suitable material and which serves to effect a tight joint between the head and the bell-shaped coupling member when the cars are run together. The function of the spring $u$ is to normally maintain the pipe $t$ in an extended position, and it also materially assists the spring $e$ in maintaining the pipe in its normal horizontal position. A spring $u'$, which is in all respects similar to the spring $u$, is arranged on the pipe $a$ and bears between the swivel-collar $b$ and the flange-head $m$ and has the same function as the spring $u$ with reference to said pipe $a$.

To the outer end of the pipe $t$ is secured a coupling nozzle or extension $y$, which is of reduced diameter and is adapted to enter the bell-shaped member $n$ when the cars run together and to enter the opening formed between the flange-heads $m$ $o$ and the packing-ring $s$ in the recess therein and effect a joint between the pipes which will be thoroughly air, gas, or steam tight.

A piston-packer $z$, made of rubber or other suitable material, is placed on the coupling-nozzle and is adapted to move in and out thereon and is of such size as to be adapted to enter the annular recess at the inner end of the bell-shaped member of the coupling and to effect a tight joint between the same and the coupling-nozzle. A coiled extensile spring $z'$ is placed on the coupling-nozzle, is secured at its inner end, and has its outer end secured to the piston-packer to prevent the latter from being pulled off the end of the coupling-nozzle. The length of the spring is such that it is inert when the piston-packer is at the outer end of the coupling-nozzle, thereby retaining the piston-packer in that position normally; but when the cars are run together and the coupling-nozzle enters the bell-shaped member the said spring serves to force the piston-packer into the inner end of the bell-shaped member and to maintain the same therein at all times and to compensate for the longitudinal play of the cars.

The springs $u$ and $u'$ by exerting a constant longitudinal thrust on the pipes $a$ and $t$ serve to maintain said pipes at all times in contact with each other when coupled end to end, and thus prevent independent longitudinal movement of said pipes, hence maintaining said pipes in unison and preventing the efficiency of the coupling from being impaired by the motion of the cars.

The packing-ring $s$, head $v$, and piston-packer, in addition to their functions as packings to secure and maintain a tight joint between the pipes $a$ and $t$, serve also to center the nozzle in the pipe $a$, and thus maintain the pipes $a$ and $t$ in a straight line with relation to each other at all times when coupled.

When the coupling-nozzle enters the outer end of the pipe $a$, it comes in contact with the enlarged head of the valve-rod $k$ and moves the said valve inward from its seat, so as to establish communication between the pipes $a$ and $t$ and allow the passage of air, gas, steam, or fluid through the pipes in the cars. The pressure of the air, gas, steam, or fluid will normally, when the cars are disconnected, serve to close the valve in its seat and cut off the escape of the air, gas, steam, or fluid; but I prefer to also employ a coiled extensile spring $a'$, arranged on the valve-rod for this purpose, for the sake of additional security against loss of air, gas, steam, or fluid when the cars are uncoupled.

I have illustrated an automatic car-coupler such as is now in common use for coupling cars together for the purpose of explaining the object and operation of my invention graphically; but it will be understood that my train-pipe coupling is not dependent upon any particular form of car-coupling for its operation and is wholly independent thereof and may be employed with effect on cars provided with any preferred means for coupling the cars together.

By reference to Figs. 1 and 2 it will be seen that I have duplicated the train-pipe couplings on each car, arranging the members in pairs and connecting the pipes $a$ and $t$ on each car by means of a flexible pipe $b'$. By this arrangement the members of the coupling will always match when the cars are run together, as will be readily understood.

In order to adapt a car provided with my improved train-pipe coupling to be used in connection with a car which is not so provided without affecting the efficiency of the air-brake, heating, or lighting system of the train, I attach an ordinary coupling-pipe D, such as has heretofore been commonly employed on air-brake systems, to the pipe B by means of a T-coupling, as shown, and provide a cock E in such coupling, which is normally turned to cut off air, gas, steam, or fluid from the pipe D. I also employ a cock F in the pipe B at a point between the pipes D and $a$, which cock F is normally open to permit free communication between the pipes B and $a$; but when a car provided with my improved train-pipe coupling is to be coupled to one which is not so provided the cock F must be closed and the cock E opened, as will be readily understood.

Having thus described my invention, I claim—

1. In a train-pipe coupling, the combination of the pipe $a$, the swivel-collar $b$ through which said pipe passes, and having the pivots $c$, whereby the pipe $a$ is adapted to play longitudinally and to swing freely at its ends, and the spring $c$ connected to the inner end of the pipe, for the purpose set forth, substantially as described.

2. The combination, in a train-pipe coupling, of the pipe $a$, the swivel-collar $b$ through which said pipe passes, the latter having the flange $d$; and the spring $u'$ on said pipe and bearing against said flange $d$, substantially as described.

3. In a train-pipe coupling, the combination with the pipe $a$ having the bell-shaped member $n$, the throat-packing $r$, and the valve $i$; of the pipe $t$, having the head $v$, the nozzle $y$, forming an extension of the pipe, and adapted to pass through the throat-packing and operate the valve $i$, the piston-packing $z$ on said nozzle, and the spring $z'$ connected to said piston-packing, substantially as described.

4. In a train-pipe coupling, the combination with the pipe having the bell-shaped member, of the pipe $t$ having the head $v$, and the extending nozzle $y$, the piston-packing $z$ movable on said nozzle, and the spring $z'$ bearing against said piston-packing, for the purpose set forth, substantially as described.

5. In a train-pipe-coupling system, the pipes $a$ and $t$ forming the opposing members of the coupling, the flexible pipe $b'$ connecting said pair of pipes, the air, gas, steam or fluid pipe B of the air-brake, heating, or lighting system, the flexible pipe $f$ connecting said pipes $a$, B, the pipe D connected to pipe B and the cocks E and F, all combined and arranged substantially as and for the purposes set forth.

6. In automatic train-pipe-coupling systems, the pipes $a$ and $t$ arranged in pairs, and forming the opposing members of the couplings, the pivot-supports $b$ for said pipes, and in which the latter are free to play longitudinally and to swing at their ends, and the springs $e$ at the inner ends of said pipes, for the purpose set forth, substantially as described.

7. In a train-pipe coupling, the combination of the pipe $a$ having the flange-head $m$, the bell-shaped member having the flange-head $o$, said flange-heads having the annular opening formed between them, the packing-ring in said opening, and the bolts $p$, for the purpose set forth, substantially as described.

8. In an automatic train-pipe-coupling system, the pipes $a$ and $t$ forming the opposing members of the coupling, arranged in pairs, the flexible pipe connecting each pair of said pipes $a$ and $t$, and the flexible pipe $f$ connecting the pipe $a$ with the air, gas, steam or fluid pipe B of the air-brake, heating or lighting system, substantially as described.

SAMUEL B. KITCHIN.

Witnesses:
J. W. GARNER,
W. W. KITCHIN.